(12) United States Patent
Gonzalez Diaz et al.

(10) Patent No.: US 11,210,770 B2
(45) Date of Patent: Dec. 28, 2021

(54) AI-BASED INSPECTION IN TRANSPORTATION

(71) Applicant: Hitachi, Ltd., Tokyo (JP)

(72) Inventors: Maria Teresa Gonzalez Diaz, Mountain View, CA (US); Dipanjan Ghosh, Santa Clara, CA (US); Adriano Arantes, San Jose, CA (US); Michiko Yoshida, San Jose, CA (US); Jiro Hashizume, San Jose, CA (US); Chetan Gupta, San Mateo, CA (US); Phawis Thammasorn, Fayetteville, AR (US)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 16/355,419

(22) Filed: Mar. 15, 2019

(65) Prior Publication Data
US 2020/0294220 A1 Sep. 17, 2020

(51) Int. Cl.
*G06T 7/00* (2017.01)
*G06T 7/70* (2017.01)
*G06K 9/62* (2006.01)

(52) U.S. Cl.
CPC .......... *G06T 7/0002* (2013.01); *G06K 9/6267* (2013.01); *G06T 7/70* (2017.01); *G06K 2209/21* (2013.01); *G06K 2209/23* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,167,583 B1 | 1/2007 | Lipson et al. | |
| 2012/0057773 A1 | 3/2012 | Langmatz et al. | |
| 2019/0095877 A1* | 3/2019 | Li | G06Q 10/20 |
| 2019/0213724 A1* | 7/2019 | Avrahami | G06T 7/70 |
| 2020/0111061 A1* | 4/2020 | Stucki | G06Q 10/20 |
| 2020/0111203 A1* | 4/2020 | Tan | G06K 9/6268 |
| 2020/0210786 A1* | 7/2020 | Xu | G06Q 40/08 |

FOREIGN PATENT DOCUMENTS

WO 2017/171651 A1 10/2017

OTHER PUBLICATIONS

Extended European Search Report for related European Application No. 20158991.8 dated May 8, 2020 (7 pages).

(Continued)

*Primary Examiner* — Justin P. Misleh
(74) *Attorney, Agent, or Firm* — Procopio, Cory, Hargreaves & Savitch, LLP

(57) ABSTRACT

Example implementations described herein involve defect analysis for images received from a camera system, which can involve applying a first model configured to determine regions of interest of the object from the images, applying a second model configured to identify localized areas of the object based on the regions of interest on the images; and applying a third model configured to identify defects in the localized ones of the images.

17 Claims, 14 Drawing Sheets

(56) References Cited

OTHER PUBLICATIONS

De Deijn, Jeffrey, "Automatic Car Damage Recognition using Convolutional Neural Networks", PricewaterhouseCoopers Pensions, Actuarial & Insurance Services Technical Report, Mar. 29, 2018; 56 pages.

Tao, X. et al. "Automatic Metallic Surface Defect Detection and Recognition with Convolutional Neural Networks" Applied Sciences 2018, Sep. 6, 2018; 15 pages.

Lin, H. et al. "Automated defect inspection of LED chip using deep convolutional neural network" Journal of Intelligent Manufacturing; Mar. 2018; 11 pages.

Ferguson, M. et al. "Automatic Localization of Casting Defects with Convolutional Neural Networks" IEEE International Conference on Big Data; 2017;10 pages.

Redmon, J. et al. "You Only Look Once: Unified, Real-Time Object Detection" Proceedings of the IEEE Conference on Computer Vision and Pattern Recognition, 2016, 10 pages.

Patil, K. et al. "Deep Learning Based Car Damage Classification", 2017 16th IEEE International Conference on Machine Learning and Applications (ICMLA); Dec. 2017; 6 pages.

Ren, S. et al. "Faster R-CNN: Towards Real-Time Object Detection with Region Proposal Networks" in Advances in Neural Information Processing Systems, 2015, 9 pages.

Lin, T. et al. "Microsoft COCO: Common Objects in Context," in European Conference on Computer Vision, 2014; 16 pages.

\* cited by examiner

| | |
|---|---|
| Descriptor: A<br>Description: Regular 4-side-point for a compact car<br>Attributes:<br>Inspection Type: regular<br>Object: car<br>Size type: compact<br>Dimension: 120x73 feet<br>Parking size: A-1<br>Starting point: SP-A-1<br>No. view points 4<br>View point: left, front, back, right<br>Pictures: 1<br>Focus area: none | Descriptor: B<br>Description: Regular 6-side-point for a truck 16"<br>Attributes:<br>Inspection Type: regular<br>Object: truck<br>Size type: large<br>Dimension: 200x73 feet<br>Parking size: B-2<br>Starting point: SP-B-2<br>No. view points 6<br>View point: left, left, front, back, right, right<br>Pictures: 1<br>Focus area: none |

FIG. 4

Task 1: go to viewpoint vp1 with p1
    steps: turn left, move to vp1, turn right
    action: capture image, send image
Task 2: go to viewpoint vp2 with p2
    steps: turn left, move to corner 1, turn right, move to vp2
    action: capture image, send image
Task 3: ...
Task 4: ...

AI-BASED INSPECTION IN TRANSPORTATION

BACKGROUND

Field

The present disclosure is generally directed to transportation inspection systems, and more specifically, to utilization of Artificial Intelligence (AI) based inspection in transportation systems.

Related Art

One of the challenges in the transportation industry is to maintain assets in good condition to avoid accidents and downtimes. It can be imperative to proactively identify possible defects and reduce the impact of degradation in the assets by effective maintenance processes. However, the maintenance is not effective if there is lack of proper verification and tracking of the equipment.

Inspection of assets is utilized to proactively find defects and streamline the maintenance process. Inspection includes a set of tasks to monitor and evaluate the equipment condition. The inspection process requires proper data collection of various elements, such as visual information, equipment settings, operating conditions, events, and digital records that facilitate the identification of defects. The quality of assessment directly impacts the efficiency of maintenance plans, repair time and cost. Therefore, adequate processes augmented with cutting-edge tools and technology to achieve high inspection quality are needed.

In the transportation industry, inspection is mostly manual and relies on human operators who usually perform exterior checkup visually to identify structural variations, surface problems or other malfunction symptoms. The operators use their knowledge, judgement and limited records to analyze the equipment status. Thus, the identification of the problems can be inconsistent and subject to operator skills and experience. Existing automated systems commonly use tools based on instrumentations with fixed camera points, sensor or/and ad-hoc interfaces. Manual inspection or fixed configuration may not be sufficient for dynamic requirements of transportation environments.

Existing related art automated systems commonly use tools based on fixed instrumentations with cameras, sensors or/and other ad-hoc interfaces. For example, related art transportation projects have involved a fixed infrastructure such as wayside, arc-shape or stand units with camera points and sensors. Vehicles or trains move across the platform, while the related art system collects information like images, video and sensor readings. The vision recognition models developed in such related art implementations are restricted to specific components or defects and the models cannot multi-task, i.e., the same model or the system cannot identify all defects in various components using a single image of the vehicle. Further, the same model is not able to localize all possible defects in various components using a single image of the vehicle. Therefore, this type of related art inspection system is not very scalable and limited to predefined areas.

Traditional automated visual analysis involves specialized vision recognition models that require high tuning to achieve acceptable accuracy. However, these models do not provide good performance if the surface, texture or shape considerably changes. Recent studies have explored AI methods to improve not only quality but also a generalization of the results to different types of defects.

In the transportation industry, existing related art AI methods are mostly oriented to identify defects using image classification techniques. However, the accuracy of such related art implementations is highly impacted by the region of analysis. For example, if the defect region is considerably small compared to the image size or variation, the identification of the defect is hard. Therefore, the method requires large datasets to generalize to different type of defects with acceptable quality.

In the manufacturing industry, related art implementations directed to metallic products, lights, fabrics or food inspection have involved specialized mechanisms to not only detect defects but also localize them. These related art approaches analyze the image, localize target objects and then identify if the defect exists. Since target images contain specific objects, one localization step already improves the identification accuracy. However, in images where the region of analysis is wide with a variety of objects and components, one localization step is not sufficient to achieve high quality.

Finally, in other domains, related art implementations have involved AI methods to identify fine-grain objects (including vehicles and parts) in a landscape image (wide views and object variety). However, such related art implementations have not addressed the defect identification problem.

SUMMARY

Thus, related art implementations for defect analysis do not work in conjunction with each other. Related art models are restricted to identifying limited components in the vehicle or certain types of defects only. Specialized data collection is required in related art models to identify the component or defect. For example, given an image of a car, a related art model will have the ability to identify tires. Another defect identification model will require a different data collection restricted to tires only to identify whether there is a defect. The result of such related art systems is that it requires a library of models to identify components as well as defects, hence the inspection is not scalable. Further, knowledge obtained from one system in the transportation domain cannot be transferred to a different domain. For example, dent related defect knowledge does not transfer from automobiles to aircrafts.

Example implementations described herein addresses the inefficient manual inspection process and poor quality of defect identification in dynamic environments by developing a system for visual defect identification. The solution in the example implementations described herein integrates an inspection planning framework and advanced AI-based analysis. The example implementations proposed herein benefits from a systematic inspection guidance that facilitates consistent, diverse and scalable data collection from assets. The visual analysis uses a scalable three level defect identification mechanism trained from a collection of data related to asset defects. Example implementations described herein not only demonstrates acceptable identification performance but also localizes and generalizes the defects across multiple transportation assets.

Aspects of the present disclosure involve a method for defect analysis of an object, which can include for receipt of a plurality of images of the object, applying a first model configured to determine regions of interest of the object from the images; applying a second model configured to identify localized areas of the object based on the regions of interest on the images; and applying a third model configured to identify defects in the localized ones of the images.

Aspects of the present disclosure involve a computer program storing instructions for defect analysis of an object, which can include for receipt of a plurality of images of the object, applying a first model configured to determine regions of interest of the object from the images; applying a second model configured to identify localized areas of the object based on the regions of interest on the images; and applying a third model configured to identify defects in the localized ones of the images. The computer program can be stored in a non-transitory computer readable medium and executed by one or more processors.

Aspects of the present disclosure involve a system for defect analysis of an object, which can include for receipt of a plurality of images of the object, means for applying a first model configured to determine regions of interest of the object from the images; means for applying a second model configured to identify localized areas of the object based on the regions of interest on the images; and means for applying a third model configured to identify defects in the localized ones of the images.

Aspects of the present disclosure can involve an apparatus configured to conduct defect analysis of an object, the apparatus involving a processor, configured to, for receipt of a plurality of images of the object, apply a first model configured to determine regions of interest of the object from the images; apply a second model configured to identify localized areas of the object based on the regions of interest on the images; and apply a third model configured to identify defects in the localized ones of the images.

BRIEF DESCRIPTION OF DRAWINGS

FIG. 4 illustrates examples of attributes for A and B descriptors, in accordance with an example implementation.

DETAILED DESCRIPTION

Figure 1:
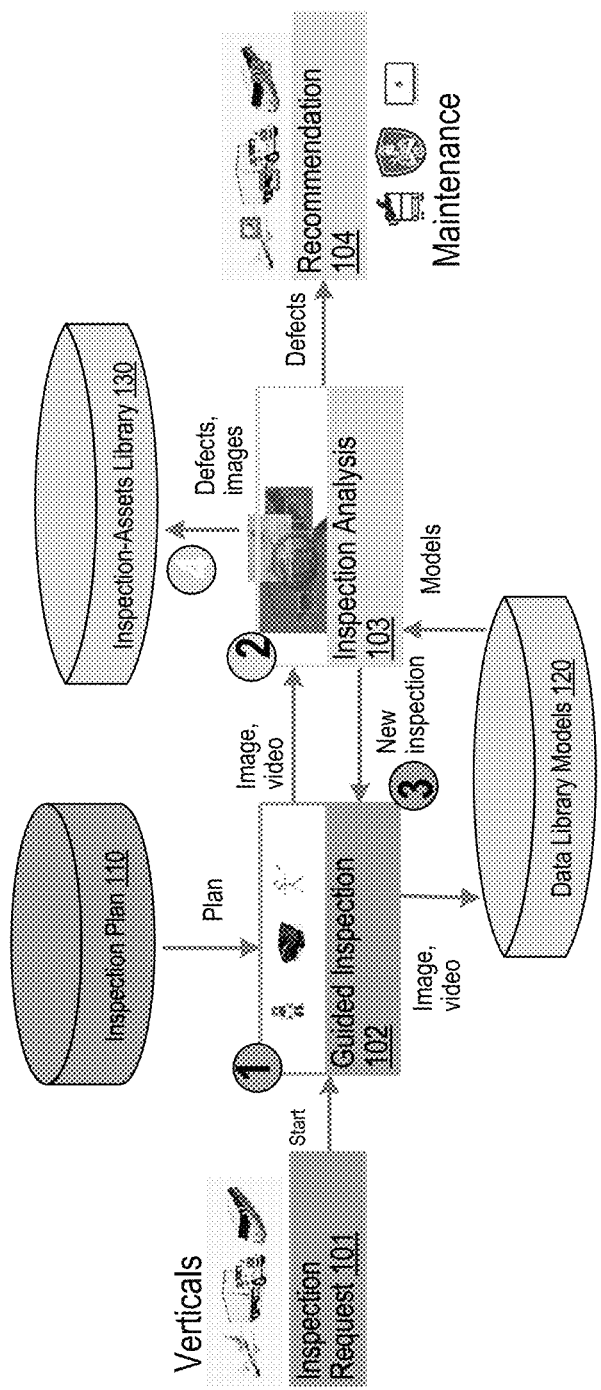
FIG. 1 illustrates the operation flow of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an inspection system to achieve high quality of defect assessment by integrating cutting-edge technologies in analytics. The system implements an automated visual inspection to augment human evaluation of the asset conditions. The system enhances existing automated systems by enabling an automatic guided inspection of relevant asset images and high-quality analysis of defects using identification and localization techniques.

FIG. 1 illustrates the operation flow of the system, in accordance with an example implementation. The inspection system involves planning and analysis services coordinated by an orchestrator. In response to an inspection request 101, there is a guided inspection 102 that involves an inspection planning service that manages a library of inspection plans 110 to automatically generate an inspection guideline based on inspection type and asset type. The plans describe the tasks, actions and paths to perform the data collection. Images and video taken during the guided inspection process are provided to inspection analysis 103 and to the data library models 120.

The inspection analysis service 103 manages a library 130 of asset-defect with a three-level localization mechanism to automatically localize and identify a variety of defects from the assets. The orchestrator controls the system flow and data sharing across planning and analysis services. Once the defects are determined from the inspection analysis 103, the defects are provided to the recommendation system 104 which indicates the maintenance that is to be done.

The operational flow of the inspection can proceed as follows as illustrated in FIG. 1.

(1) The system receives a new inspection request 101, then the inspection planning service (IPS) loads an inspection plan 110 to automatically recognize relevant viewpoints. The inspection plan assists data collection from assets including target viewpoints, paths and actions to perform. The operator executes the inspection plan and sends the pictures to the analysis service. The operator in this system can be a human, group of humans, robots, group of robots or any other data collection devices or instruments.

(2) The inspection analysis service (IAS) 103 receives the image/video collected from the asset from the guided inspection 102. The service uses a defect identification mechanism that not only detects but also localizes defects. The identification mechanism combines AI-based models from models 120 that have been trained on a rich collection of assets, components and defects of interest.

(3) Once the defect analysis is completed, the system determines if the analysis needs additional images. If required, the operator is notified to proceed with further inspection and proceeds back to guided inspection 102 to conduct a new inspection. Otherwise, the analysis is considered to be complete.

(4) Finally, inspection results are stored as digital records for future inspection monitoring of assets, and/or maintenance recommendations 104, and to enrich asset, asset-defect, planning libraries 130.

Figure 2:
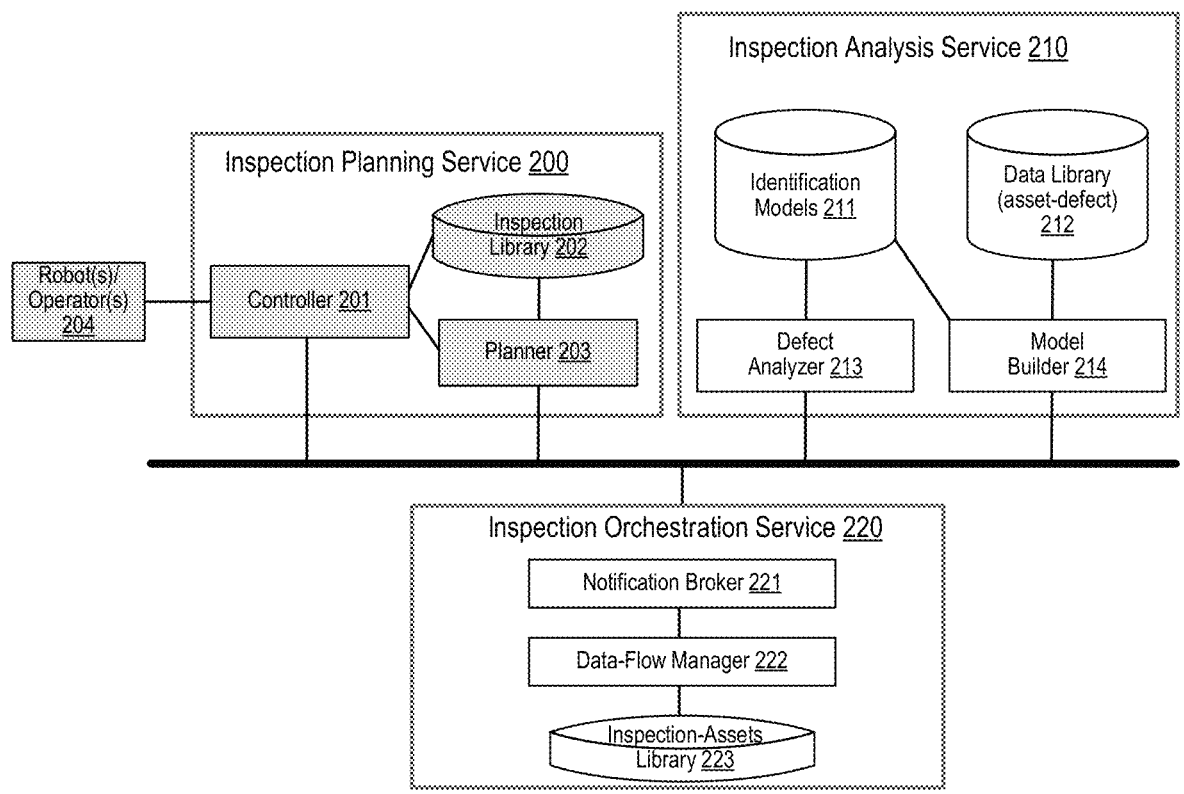
FIG. 2 illustrates the system architecture that shows data collection and analysis services coordinated by orchestration service, in accordance with an example implementation.

FIG. 2 illustrates the system architecture that shows data collection and analysis services coordinated by orchestration service, in accordance with an example implementation. The inspection system involves three main services that facilitate the operational flow described in the previous section. The summary of each component is described as follows.

Inspection Planning service (IPS) 200 facilitates automatic inspection planning to guide operator(s) 204 based on the type of inspection, type of asset, or detected defect. This service manages inspection planning of assets as performed by operators or robots 204 and manages an inspection library 202 involving a library of plans to facilitate consistent, automatic and scalable inspection execution based on type of inspection, type of asset, or focus areas. IPS 200 coordinates a guided inspection by integrating a planner 203 and controller modules 201. The planner 203 defines plans with tasks required to complete an inspection. The controller 201 defines an execution based on plans and the operator adjusts and executes the required tasks.

Inspection analysis service (IAS) 210. This service performs analysis of the asset condition by calling a defect analyzer module 213 configured to conduct analysis based on a three-level defect identification mechanism that reduces false positive detection by removing unnecessary regions from images. The analyzer executes an AI-based mechanism for defect identification. This mechanism performs a hierarchical region of interest identification. In the first step, the target assets region is identified based on the given image through use of identification models 211. Subsequently, in the second step the component region is identified from the asset region. This mechanism automatically reduces an image into a target asset region, followed by another reduction into an area of interest region. The area of interest denotes a section that can include but not restricted to a component (tire or bumper of the car, door of the train or plane), front-end of vehicle, rear-end of vehicle, or undercarriage. Finally, the analyzer determines if a defect exists or not. If it exists, the analyzer 213 determines where it exists, i.e. which asset-area region. IAS uses a model builder module 214 to generate models for defect identification and localization using an asset-defect library 212 as input training dataset. The asset-defect library 212 involves images related to assets of interest and their defects to facilitate identification and localization models based on AI techniques.

Inspection orchestrator service (IAS) 220. This service coordinates the inspection acquisition and analysis workflow. This component facilitates real time communication between both components and handles storage, access, and tracking of inspection data, (e.g., images, results, and other inspection data entities). The IOS 220 involves a notification broker to broker messages between services, a data-flow manager 222 to manage data-flow between the two services, and the inspection-assets library 223 to manage inspection assets.

Figure 3:
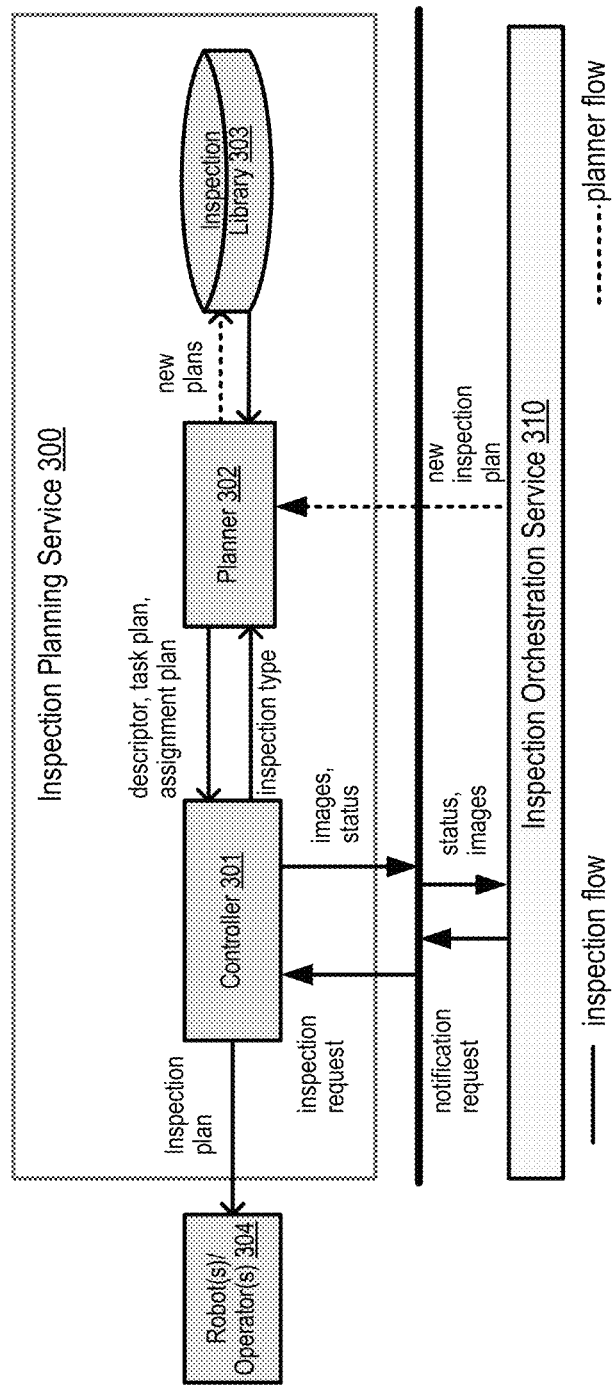
FIG. 3 illustrates the planner and controller modules of the inspection planning service, in accordance with an example implementation.

FIG. 3 illustrates the planner 302 and controller 301 modules of the inspection planning service, in accordance with an example implementation. Inspection planning service (IPS) 300 is responsible for assisting the image collection from the assets as viewpoints of interest (e.g., sides of cars, train doors or wings of airplanes). The main challenge of this service 300 is to support dynamic inspection planning and guidance of viewpoints based on a variety of characteristics such as dimensions, locations, or areas, and so on.

To address these dynamic requirements, the system uses an inspection planning framework to automatically adjust, re-configure and guide the inspection execution as per the requirement. A guided inspection is facilitated by a library of inspection plans 303 that aids the operator to consistently collect images based on inspection types, e.g., regular or specialized; asset type, e.g., a compact car or large truck; or focus areas, e.g., tire or bumper.

The controller 301 receives a notification of a new inspection request which contains data inputs such as inspection type, asset type, focused area, and meta-data required to identity an inspection plan. The planner 302, which manages the inspection plans library 303, loads the plan requested by the controller 301. The controller 301 uses pre-loaded plans to generate an execution plan and sends it to the operator(s) 304. The operator(s) 304 executes the plan and collects images. Finally, the images are sent to the orchestration service 310.

The inspection planner 302 constructs an inspection library 303 of known scenarios of assets of interests such as cars, trains or airplanes. The library 303 is a collection of plans: an inspection descriptor, task plan, and assignment plan. These plans facilitate automatic inspection guidance of operators based on inspection types, assets types or focus areas.

An inspection descriptor entails multiple attributes to describe the asset of interest as a category. For example, the inspection system has one descriptor for a compact car, and another for a large truck. The attributes $a_m$ encode input elements that represent dimensions of vehicle, relevant viewpoint (sides, top, or under), area of interest (door, tires or trunk), number of pictures to capture, and so on in accordance with the desired implementation.

FIG. 4 illustrates examples of attributes for A and B descriptors, in accordance with an example implementation. For instance, a descriptor type denoted as A refers to a regular inspection of a compact car which requires data collection from 4-side points: left, right, back, and front (see left portion of FIG. 4). Another descriptor type B refers to regular inspection for a large truck that requires data from 6-side points instead of 4 i.e., 2 left viewpoints and 2 right viewpoints (see right portion of FIG. 4). In FIG. 4, descriptor A differs from descriptor B in the dimension attribute (highlighted in bold), which implies that the operator needs to move along different distances and paths to reach the viewpoints based on the indicated dimensions.

FIGS. 5(*a*) and 5(*b*) illustrate a task plan and a map plan respectively, in accordance with an example implementation. As illustrated in FIG. 5(*a*), a task plan has a set of tasks $t_K$ required to complete the inspection $I_i$. Tasks are a set of steps to reach a target view point $vp_i$ (e.g., move-right, move straight). Tasks also involve actions $ac_i$ to perform at the viewpoint (e.g., capture or send image). The system uses the task plan to build an abstract map plan as illustrated in FIG. 5(*b*) which details the required paths $p_K$ to reach each view point $vp_i$. Once the operator reaches the viewpoints, they perform an action(s) indicated in the plan, e.g., capture the images.

Figures 5A, 5B:
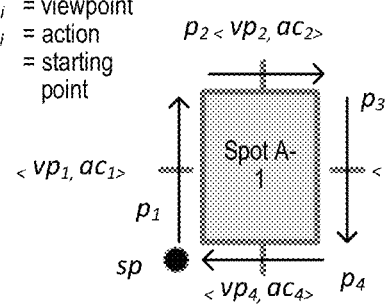
FIGS. 5(*a*) and 5(*b*) illustrate a task plan and a map plan respectively, in accordance with an example implementation.

In the example of FIGS. 5(a) and 5(b), the task plan describes a sequence of tasks to capture an image in each view point. In order to compute the steps and the map plan, the service assumes an inspection area of four sides. Based on the descriptor, the service uses asset dimensions, number of target points, number of points per side and starting point to compute the different paths and reach each point. For instance, in FIG. 5(b), there are four viewpoints (one for each side of the asset), the service computes the path $p_i$ to reach $vp_i$ and move to $vp_2$, later to $vp_3$, and so on, from the starting point.

The inspection planning service 300 assign the plans to the operator(s) 304 who can perform the data capture guided by each task and following the map to reach the viewpoints and execute the actions. The operator(s) 304 can adjust the paths according current positions, and the viewpoints and action are completed as indicated by the plan.

Figure 6:
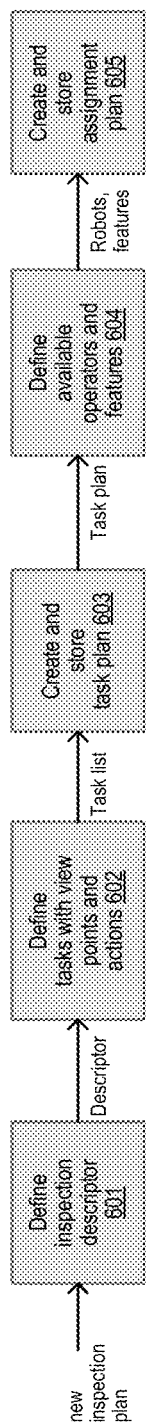
FIG. 6 illustrates an example flow of the planner, in accordance with an example implementation.

FIG. 6 illustrates an example flow of the planner, in accordance with an example implementation. The planner module 302 manages the library 303 of inspection plans that the system can execute. The planner assists the creation, and search of descriptors, task and assignment plans. When a new inspection plan is received, the planner 302 defines the inspection descriptors at 601, and the tasks with viewpoints and actions at 602 as illustrated in FIG. 5(a). The planner then creates and stores the task plan into the library 303 at 603. At 604, the planner 302 defines the available operators and features, which is used to create and store an assignment plan 605 into the library 303.

Figure 7:
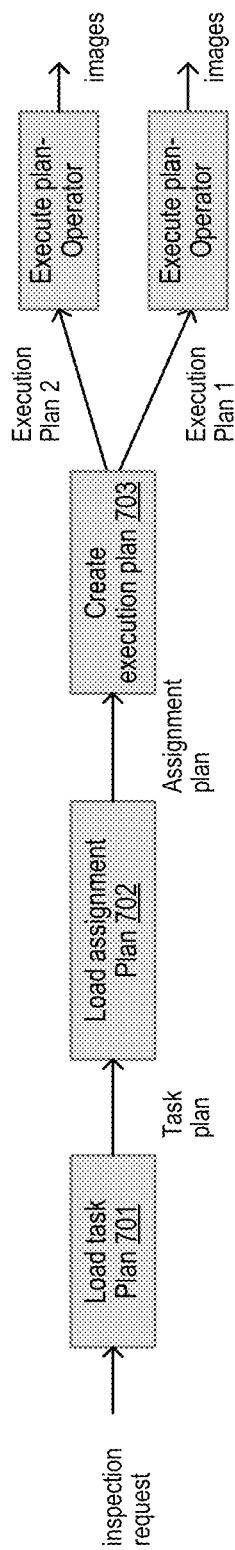
FIG. 7 illustrates an example flow of the controller, in accordance with an example implementation.

FIG. 7 illustrates an example flow of the controller, in accordance with an example implementation. The controller 301 receives an inspection request from the orchestrator 310. The inspection request contains the inspection type. The controller 301 calls the planner 302 to look up the task, map, and assignment plans at 701 and 702. Before executing the tasks, the controller 301 generates the execution plan for the operator(s) 304 at 703. The execution plan establishes the target map which involves the following steps:
  1. Calculation on positions and paths using the abstract map plan to reach the viewpoints.
  2. Calculation of path distance to reach each view point.
  3. Selection of features/device such as camera or lights, to perform the action(s) at each view point.

The controller 301 submits the execution plan to the operator(s) 304. Each operator 304 performs the assigned steps and actions. Once the execution is completed, the controller 301 informs the orchestrator 310 that the inspection job is finalized.

Figure 8:
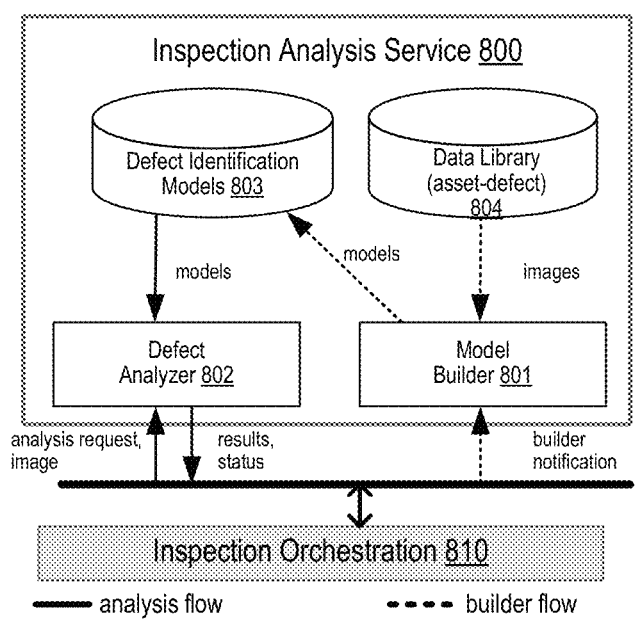
FIG. 8 illustrates an inspection analysis service, including a model builder and a defect analyzer in accordance with an example implementation.

FIG. 8 illustrates an inspection analysis service, including a model builder and a defect analyzer in accordance with an example implementation. As part of the visual assessment post data acquisition, the inspection analysis service 800 identifies defects. A defect is defined as a deviation of the target asset in shape, surface or position from a known or expected status, such as a damaged door, a dented door, and so on according to the desired implementation. The defect region can vary in characteristics and granularity. For example, some defects transform the area into a different shape or surfaces like dents or crashes. Others only alter the area with small variations like cracks or fissures. The variety of these defects makes it difficult to apply simple identification techniques like image classification. Therefore, the defect analysis requires specialized algorithms to remove unnecessary regions before identifying the defect.

As illustrated in FIG. 8, the inspection analysis service 800 involves a model builder 801 and a defect analyzer 802. The model builder 801 receives the notification from the orchestrator to generate new models using the asset-defect library 804. The defect identification models 803 are stored for additional usage from the defect analyzer module 802. The defect analyzer 802 receives a request from the orchestrator to execute the analysis of images. The defect analyzer 802 performs that analysis by using defect identification models 803. The result is sent back to the orchestrator 810. More details of the modules are explained as follows.

Figure 9:
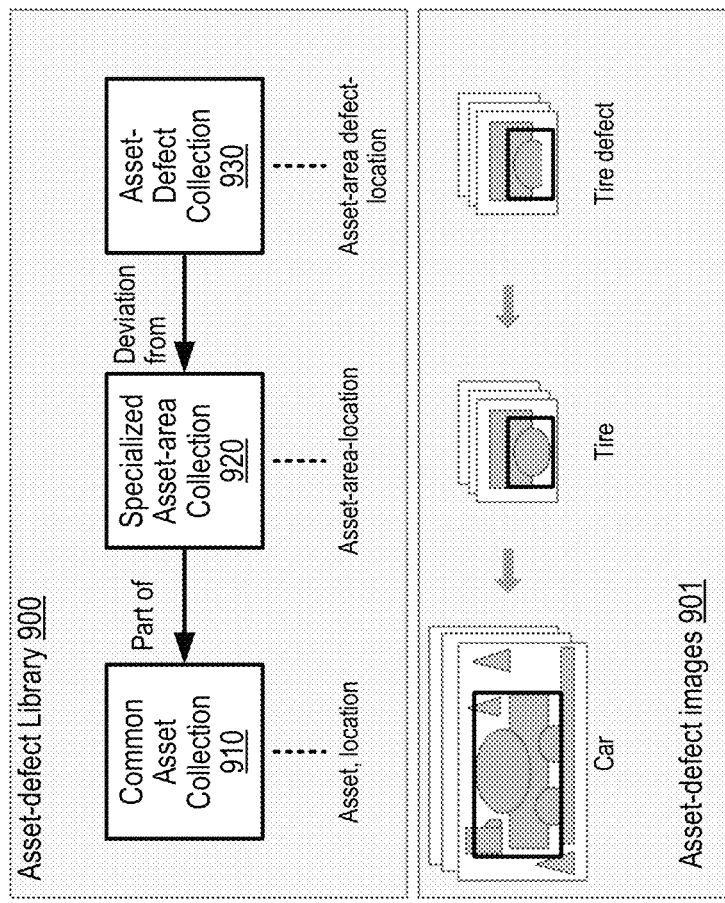
FIG. 9 illustrates an asset-defect library with images, in accordance with an example implementation.

FIG. 9 illustrates an asset-defect library with images, in accordance with an example implementation. Specifically, FIG. 9 illustrates an example of the library 900 with images 901 used for training models based on defect localization and classification techniques. The inspection analysis service contains a library 900 with three types of collections: common assets 910, specialized asset-areas 920, and asset-defect images collection 930.

The common asset collection 910 compiles image viewpoints from assets of interest, such as cars, trucks, and airplanes with extensive variations of colors, structure, surface and angle. Each image also includes coordinates (x-y) to denote the area where the asset located. The specialized asset-area collection 920 compiles the specific asset-areas of interest such as tire or bumper of the car, front-end of train, or undercarriage of the vehicle. Similar to common asset collection 910, each image also includes the coordinates labels where the object exists. The asset-defect collection 930 compiles an extensive dataset of target assets and asset-components with extensive examples of defects, such as cracks, scratches, holes, or dents and their variations of colors, structure, surface and viewpoints. As illustrated in FIG. 9, asset-defect images 901 can thereby have gradations of images, from images of tire defects, to images of tires, and images of cars.

Figure 10:
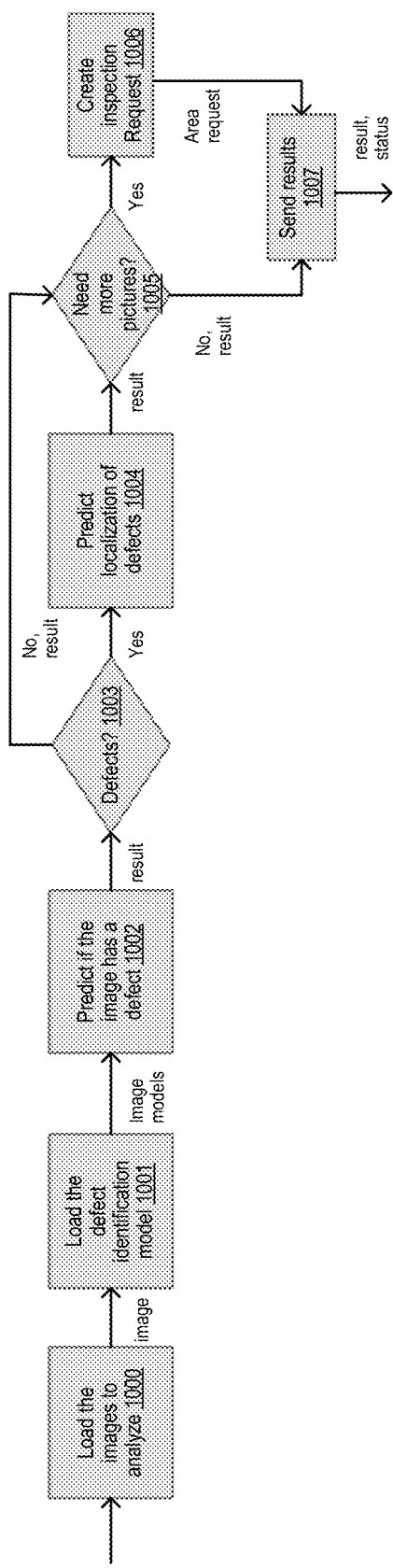
FIG. 10 illustrates an example flow of the defect analyzer, in accordance with an example implementation.

FIG. 10 illustrates an example flow of the defect analyzer, in accordance with an example implementation. The defect analyzer 802 is the module responsible for coordinating the analysis of the images sent by the inspection planning service. The defect analyzer 802 loads the images and calls the analysis algorithm. If the algorithm determines the need of analyzing more focus areas, the orchestrator 810 is notified to request a specialized data acquisition. Otherwise, the analyzer 802 sends the defect results and informs the orchestrator service that the analysis has finished successfully.

At 1000, the analyzer loads the input image specified in the request. At 1001, the identification mechanism loads models trained with the asset-defect library. At 1002, the loaded models conduct a prediction as to whether a defect exists in the input image. At 1003, a determination is made as to whether defects exist in the image provided based on the model results. If so (Yes), then the flow proceeds to 1004 to predict the coordinates where the defect is located, otherwise (No) the flow proceeds to 1005.

At 1005, a determination is made by the analyzer as to whether more pictures are needed due to a low confidence level of the prediction. If so (Yes) the flow proceeds to 1006 to create a new inspection request with a focus area. Otherwise (No) the results are sent to the orchestrator at 1007.

In example implementations, the complexity of the defect variety and properties are addressed by developing a three-level defect identification mechanism to localize important areas first, and therefore prevent false defect conclusions. The identification mechanism involves a two-step localization process followed by a classification step. This pipeline has demonstrated significant improvement over simple object localization or defect classification methods.

Figure 11:
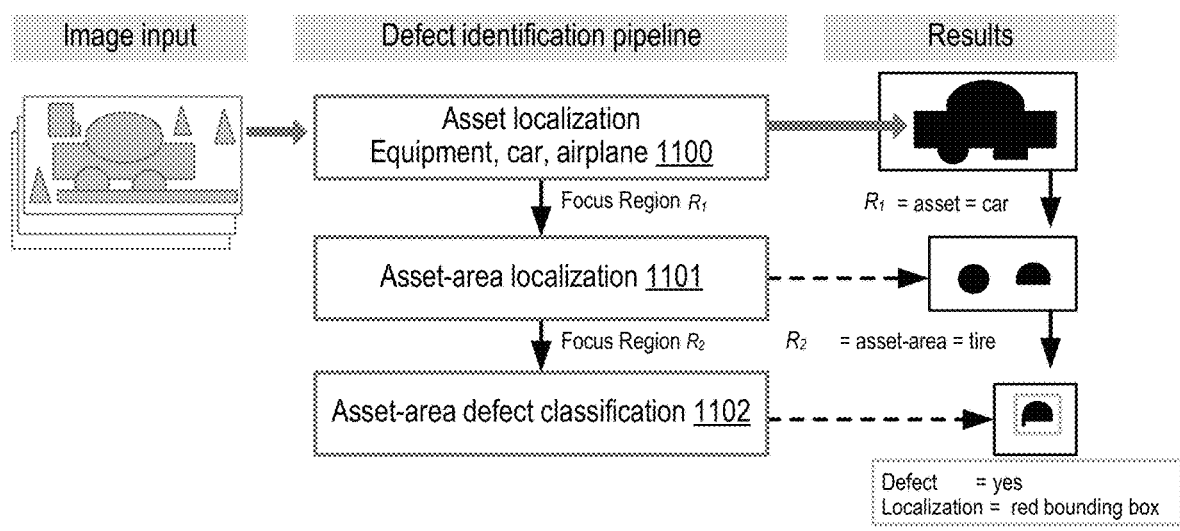
FIG. 11 illustrates an example flow of the three-level defect identification process, in accordance with an example implementation.

FIG. 11 illustrates an example flow of the three-level defect identification process, in accordance with an example implementation, as well as examples of results. The three-level defect identification process involves the following:

Asset localization 1100 is a localization algorithm that identifies the complete asset area as an asset region of interest (e.g., target equipment area, car, airplane, etc.) The localization algorithm predicts if the asset exists; if true, then the method predicts the coordinates of region $R_1$ where the asset exists as shown in the results. The prediction is performed using a pre-trained model from the asset-defect library.

After the asset region of interest $R_1$ is identified, the second step in defect identification is the asset-area localization 1101, which involves the localization of asset-area region $R_2$. This localization step uses region $R_1$ as an input image. The new region $R_2$ is expected to represent specific areas such as doors of a car, the wings of airplane or front-end side of the train. This localization step predicts if the asset-area regions of interest exist. If they do, then the flow proceeds to predict the coordinates of region $R_2$.

Asset-area defect classification 1102 is a classification method that evaluates if defect exists using the area $R_2$ as input. The underlying assumption is that $R_2$ belongs to a specific asset component or part with a known shape, structure, position or texture. The classification model has learned the characteristics of the component regions with defects and without defects. Therefore, the defect classifier determines if the differences of $R_2$ lead to defects or not.

From the execution of the methods described above, three main types of results are thereby generated: a) defects, if the existing input image have defects; b) where, the localization of the region $R_2$ with defects; and c) confidence levels of the predictions.

Figure 12:
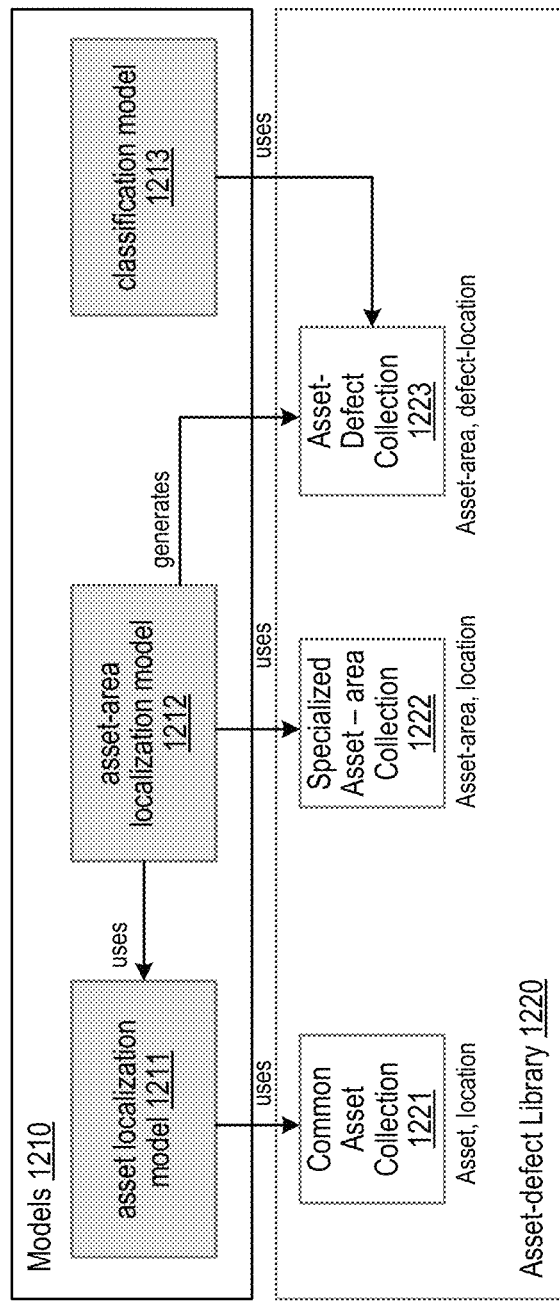
FIG. 12 illustrates an example of the model builder module, in accordance with an example implementation.

FIG. 12 illustrates an example of the model builder module, in accordance with an example implementation. The model builder module generates the required models 1210 to analyze input images of assets and predict possible defects. The builder uses the asset-defect library 1220 as training dataset to learn defects features using localization and classification methods. Examples of localization and classification methods that can be utilized include fast region-based convolutional networks (R-CNN) and convolutional neural networks (CNN). One of the challenges of this module is to extract features that generalize to multiple types of defects. In order to address the challenge, the builder implements three different models as described below.

Asset localization model 1211 is trained using a large public dataset of common objects. Since this common object collection 1221 includes images from cars, airplanes or trains, the system can reuse the trained model to localize target assets, (e.g., cars, airplane or trains). This model also identifies the asset region $R_1$ as described previously.

Specialized asset-area or asset model 1212 learns features of specialized objects of interest 1222, (e.g., asset-components related to a specific transportation domain such as vehicles) and generates asset-defect collection 1223. The system extends the asset localization model to identify and localize specialized regions. This new model can localize specialized components denoted as $R_2$ as described previously.

Defect classification model 1213 uses component region $R_2$ with defects and without defects. Since the image has been reduced to specific view areas, the method is configured to learn relevant features that can predict with high performance the variations between good condition images and images indicative of damage.

Figure 13:
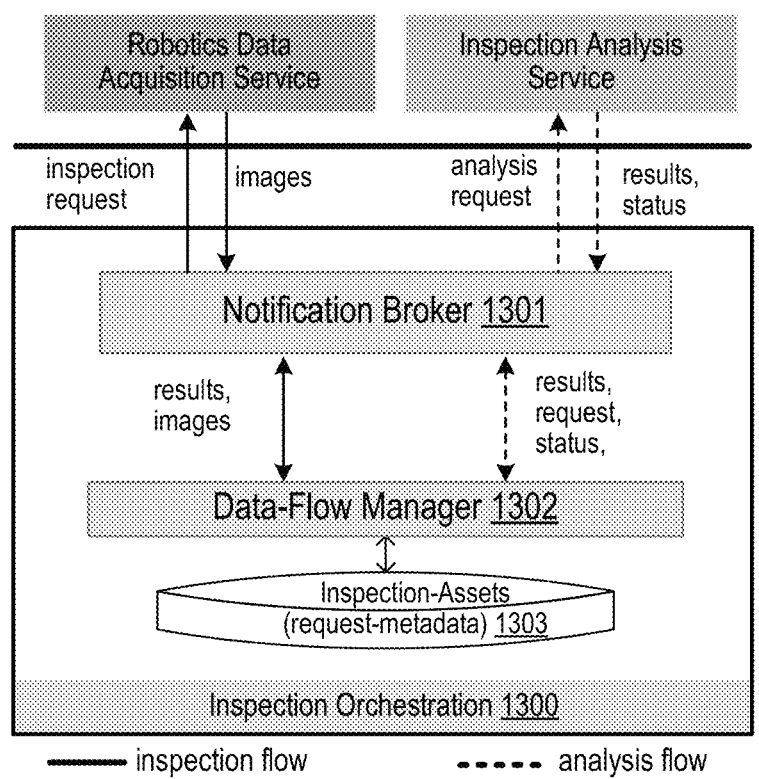
FIG. 13 illustrates an example of an inspection orchestrator service, in accordance with an example implementation.

FIG. 13 illustrates an example of an inspection orchestrator service, in accordance with an example implementation. The inspection orchestrator 1300 facilitates real time integration of data acquisition and analysis. The service implements a notification module 1301 to send messages across the components and coordinate the inspection workflow. Additionally, the data-flow manager module 1302 handles data access and storage to manage data related to the inspections, assets and results.

The orchestrator manages data used and shared across the components with the purpose of providing asset condition monitoring in an inspection-assets library 1303. The orchestrator can manage three types of data entities:

1. Inspection information: inspection requests, collected images and status, examples of the format as follows:

Inspection request:

| RequestID | InspectionType | DescriptorId | AssetId | Date |
|---|---|---|---|---|
| e48f7a44 | Regular | largeTruck-1 | FV291-0 | Nov. 28, 2018 |

Images:

| RequestID | Filename | Viewpoint | ImageId | Date |
|---|---|---|---|---|
| e48f7a44 | Img1.jpg | Front | 1 | Nov. 28, 2018 |
| e48f7a44 | Img2.jpg | Back | 2 | Nov. 28, 2018 |

Inspection status:

| RequestID | Status | Date |
|---|---|---|
| e48f7a44 | Complete | Nov. 28, 2018 |

2. Analysis information: analysis results, defect localization, confidence levels, and analysis status, example formats as follows:

Analysis results (by image):

| RequestID | ImageId | DefectResult | Confidence | Date | Status |
|---|---|---|---|---|---|
| e48f7a44 | 1 | Yes | 98.1 | Nov. 28, 2018 | Complete |
| e48f7a44 | 2 | No | 86.2 | Nov. 28, 2018 | |

Localization results (by image):

| RequestID | ImageId | X1 | X2 | Y1 | Y1 | Confidence |
|---|---|---|---|---|---|---|
| e48f7a44 | 2 | 40 | 80 | 20 | 100 | 82.6 |

Analysis status:

| RequestID | Status | Result | Date |
|---|---|---|---|
| e48f7a44 | Complete | Defect found | Nov. 28, 2018 |

3. Assets information: assets and asset condition, example as follows:

| AssetId | Condition | Last inspection Id |
|---------|-----------|--------------------|
| FV291-0 | With defects | e48f7a44 |

The flow in FIG. 13 can involve the following procedure. When a new inspection request is received by inspection orchestrator 1300, the notification broker 1301 notifies the inspection planning service (e.g. robotics data acquisition service 1310 for implementations involving a robotic camera system) when a new inspection request is received. The inspection planning service provides images back to notification broker 1301. When the operations by the inspection planning service is complete, an analysis request is sent by notification broker to the inspection analysis service 1320. The inspection orchestrator 1300 then coordinates interaction for specialized inspection requested by the inspection analysis 1320 by sending analysis requests and providing notifications for new specialized inspections. The results, requests and images are stored into inspection-assets library 1303.

Example implementations are directed to asset maintenance, however can be extended to any transportation system. For example, in fleet rental systems, example implementations can inspect and track conditions of fleet before and after a rental. In industrial machinery systems, the example implementations can inspect and track conditions of industrial machines. In vehicle manufacturing systems, the example implementations can inspect conditions of vehicle on the manufacturing line. In vehicle insurance systems, the example implementations can inspect and track damage conditions after an accident. For government regulation, example implementations can inspect vehicle, train, or airplanes to satisfy government regulations on the road. Such domains have still low maturity of inspection practices. Since the inspections are mostly manual, the tracking and verification is minimal. The system can automate their visual inspection process and assist managers to accelerate identification of possible problems and improve their business operations.

Figure 14:
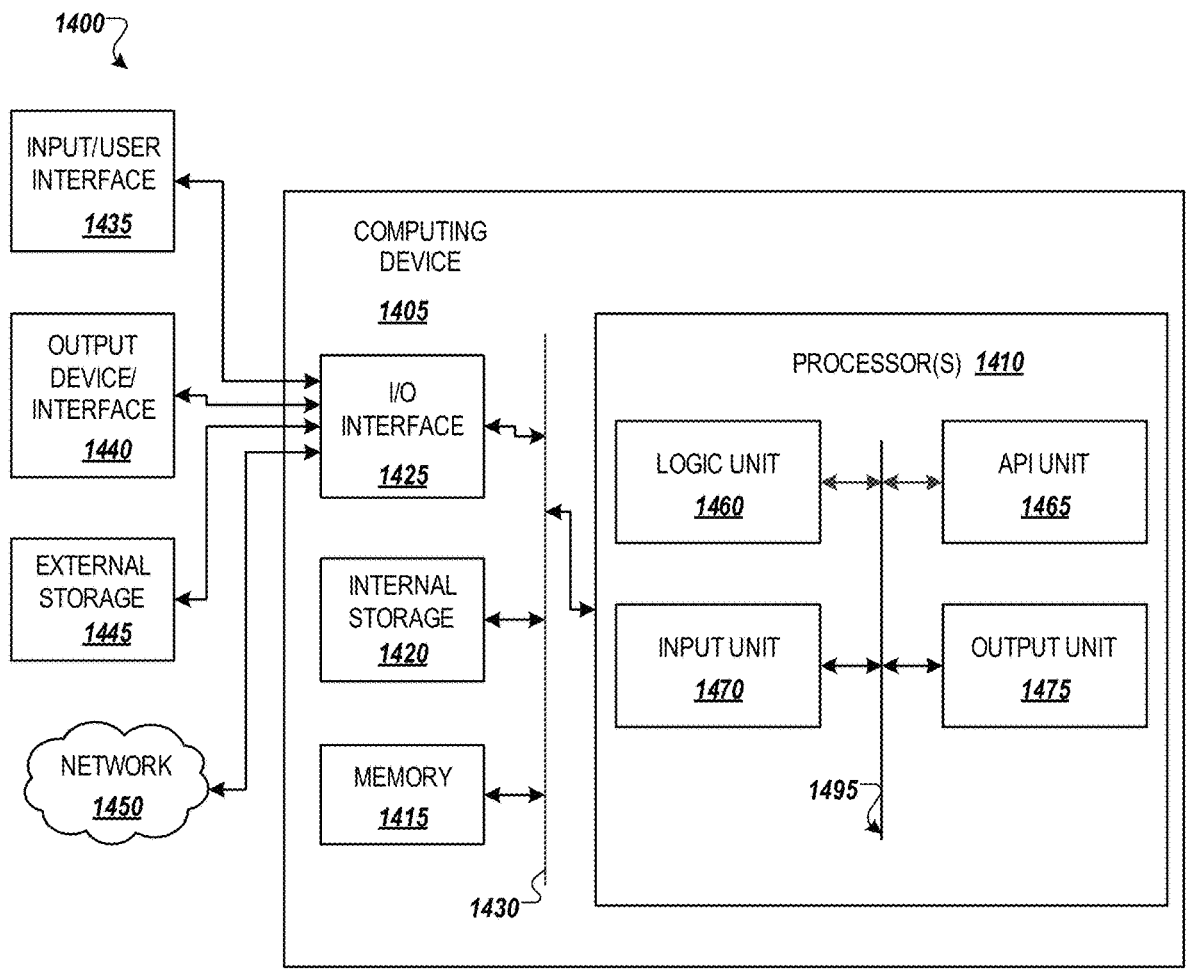
FIG. 14 illustrates an example computing environment with an example computer device suitable for use in example implementations.

FIG. 14 illustrates an example computing environment with an example computer device suitable for use in example implementations. Computer device 1405 in computing environment 1400 can include one or more processing units, cores, or processors 1410, memory 1415 (e.g., RAM, ROM, and/or the like), internal storage 1420 (e.g., magnetic, optical, solid state storage, and/or organic), and/or I/O interface 1425, any of which can be coupled on a communication mechanism or bus 1430 for communicating information or embedded in the computer device 1405.

Computer device 1405 can be communicatively coupled to input/user interface 1435 and output device/interface 1440. Either one or both of input/user interface 1435 and output device/interface 1440 can be a wired or wireless interface and can be detachable. Input/user interface 1435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1440 may include a display, television, monitor, printer, speaker, braille, or the like. In some example implementations, input/user interface 1435 and output device/interface 1440 can be embedded with or physically coupled to the computer device 1405. In other example implementations, other computer devices may function as or provide the functions of input/user interface 1435 and output device/interface 1440 for a computer device 1405. In example implementations involving a touch screen display, a television display, or any other form of display, the display is configured to provide a user interface.

Examples of computer device 1405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1405 can be communicatively coupled (e.g., via I/O interface 1425) to external storage 1445 and network 1450 for communicating with any number of networked components, devices, and systems, including one or more computer devices of the same or different configuration. Computer device 1405 or any connected computer device can be functioning as, providing services of, or referred to as a server, client, thin server, general machine, special-purpose machine, or another label.

I/O interface 1425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1400. Network 1450 can be any network or combination of networks (e.g., the Internet, local area network, wide area network, a telephonic network, a cellular network, satellite network, and the like).

Computer device 1405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Memory 1415 may be configured to manage inspection library, inspection-assets library, and data library as illustrated in FIG. 2, as well as the flows described herein for loading into processor(s) 1410.

Processor(s) 1410 can execute under any operating system (OS) (not shown), in a native or virtual environment. One or more applications can be deployed that include logic unit 1460, application programming interface (API) unit 1465, input unit 1470, output unit 1475, and inter-unit communication mechanism 1495 for the different units to communicate with each other, with the OS, and with other applications (not shown). The described units and elements can be varied in design, function, configuration, or implementation and are not limited to the descriptions provided. Processor(s) 1410 can be in the form of physical processors or central processing units (CPU) that is configured to execute instructions loaded from Memory 1415.

In some example implementations, when information or an execution instruction is received by API unit 1465, it may be communicated to one or more other units (e.g., logic unit 1460, input unit 1470, output unit 1475). In some instances, logic unit 1460 may be configured to control the information flow among the units and direct the services provided by API unit 1465, input unit 1470, output unit 1475, in some example implementations described above. For example, the flow of one or more processes or implementations may be controlled by logic unit 1460 alone or in conjunction with API unit 1465. The input unit 1470 may be configured to obtain input for the calculations described in the example implementations, and the output unit 1475 may be configured to provide output based on the calculations described in example implementations.

Processor(s) 1410 can be configured to conduct defect analysis of an object through, for receipt of a plurality of images of the object, applying a first model configured to determine regions of interest of the object from the images; applying a second model configured to identify localized areas of the object based on the regions of interest on the images; and applying a third model configured to identify defects in the localized ones of the images as illustrated in FIGS. 9-12. As illustrated in FIGS. 9-11, the first model can be a machine learning model trained against images of a plurality of different objects such as asset localization 1100, the second model can be a machine learning model trained against images of various areas of a plurality of different objects such as asset component localization 1101, and the third model can be a machine learning model trained against images of defects of a plurality of different objects such as asset-area defect classification 1102.

Processor(s) 1410 can be configured to instruct a camera system to provide the plurality of images through capturing the plurality of images of the object from determined viewpoints as illustrated in FIGS. 5(*a*), 5(*b*) and 6. Depending on the desired implementation, the viewpoints can be determined based on trained data of the first model as illustrated in FIGS. 3-7. As illustrated in FIGS. 5(*a*) and 5(*b*), processor(s) 1410 can be configured to generate a map plan involving the determined viewpoints and instructions for instructing the camera system through a task list. The camera system can be a human operated camera taking images of an object manually, or a robotic system configured to control a position, orientation, and action of a plurality of cameras according to the map plan and the instructions, depending on the desired implementation. Such actions can include, but are not limited to, the timing and sending of the images from the camera system, the amount of flash to be utilized, the number of images to be captured, and so on in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for identifying defects of an object, comprising:
   receiving a plurality of images of an object, wherein the object is a transportation asset, and for each image of the plurality of images of the object:
   using a first model to determine a region of interest corresponding to the object, the determined region of interest defining an area of the object within the each image and having first coordinates;
   using a second model to identify localized areas of the object within the determined region of interest, the localized areas of the object defining components or subsections of the object within the each image and having second coordinates; and
   using a third model to identify defects of the object in the identified localized areas and a confidence level for the identified defects.

2. The method of claim 1, further comprising instructing a camera system to provide the plurality of images through capturing the plurality of images of the object from determined viewpoints.

3. The method of claim 2, further comprising determining the viewpoints based on trained data of the first model.

4. The method of claim 2, further comprising generating a map plan comprising the determined viewpoints and instructions for instructing the camera system; and
   for the determined confidence level of the defects identified by the third model falling below a threshold, generating a new map plan based on the localized areas, the generating the new map plan comprising calculating positions and paths to reach new viewpoints of the localized areas based on an inspection library of images, calculating path distances to reach each of the new viewpoints, selecting features for the camera system at each of the new viewpoints, and instructing the camera system to capture images with the new map plan and the new viewpoints.

5. The method of claim 2, wherein the camera system is a robot system configured to control a position, orientation, and action of a plurality of cameras.

6. The method of claim 1, wherein the first model is a machine learning model trained against images of a plurality of different objects.

7. The method of claim 1, wherein the second model is a machine learning model trained against images of various areas of a plurality of different objects.

8. The method of claim 1, wherein the third model is a machine learning model trained against images of defects of a plurality of different objects.

9. A non-transitory computer readable medium, storing instructions for identifying defects of an object, the instructions comprising:
   receiving a plurality of images of an object, wherein the object is a transportation asset, and for each image of the plurality of images of the object:
   using a first model determine a region of interest corresponding to the object, the determined region of interest defining an area of the object within the each image and having first coordinates;
   using a second model to identify localized areas of the object within the determined region of interest, the localized areas of the object defining components or subsections of the object within the each image and having second coordinates; and
   using a third model to identify defects of the object in the identified localized areas and a confidence level for the identified defects.

10. The non-transitory computer readable medium of claim 9, the instructions further comprising instructing a camera system to provide the plurality of images through capturing the plurality of images of the object from determined viewpoints.

11. The non-transitory computer readable medium of claim 10, further comprising determining the viewpoints based on trained data of the first model.

12. The non-transitory computer readable medium of claim 10, further comprising generating a map plan comprising the determined viewpoints and instructions for instructing the camera system; and
    for the determined confidence level of the defects identified by the third model falling below a threshold, generating a new map plan based on the localized areas, the generating the new map plan comprising calculating positions and paths to reach new viewpoints of the localized areas based on an inspection library of images, calculating path distances to reach each of the new viewpoints, selecting features for the camera system at each of the new viewpoints, and instructing the camera system to capture images with the new map plan and the new viewpoints.

13. The non-transitory computer readable medium of claim 10, wherein the camera system is a robot system configured to control a position, orientation, and action of a plurality of cameras.

14. The non-transitory computer readable medium of claim 9, wherein the first model is a machine learning model trained against images of a plurality of different objects.

15. The non-transitory computer readable medium of claim 9, wherein the second model is a machine learning model trained against images of various areas of a plurality of different objects.

16. The non-transitory computer readable medium of claim 9, wherein the third model is a machine learning model trained against images of defects of a plurality of different objects.

17. An apparatus configured to identify defects of an object, the apparatus comprising:
    a processor, configured to:
    receive a plurality of images of an object, wherein the object is a transportation asset, and for each image of the plurality of images of the object:
    use a first model to determine a region of interest corresponding to the object, the determined region of interest defining an area of the object within the each image and having first coordinates;
    use a second model to identify localized areas of the object within the determined region of interest, the localized areas of the object defining components or subsections of the object within the each image and having second coordinates; and
    use a third model to identify defects of the object in the identified localized areas and a confidence level for the identified defects.

* * * * *